United States Patent [19]

Dudziak

[11] Patent Number: 4,600,045
[45] Date of Patent: Jul. 15, 1986

[54] PNEUMATIC VEHICLE TIRE

[75] Inventor: Karl-Heinz Dudziak, Garbsen, Fed. Rep. of Germany

[73] Assignee: Continental Gummi-Werke Aktiengesellschaft, Hanover, Fed. Rep. of Germany

[21] Appl. No.: 597,436

[22] Filed: Apr. 6, 1984

[30] Foreign Application Priority Data

Apr. 9, 1983 [DE] Fed. Rep. of Germany ....... 3312785

[51] Int. Cl.⁴ .......................... B60C 9/02; B60C 9/11; B60C 9/18; B60C 9/28
[52] U.S. Cl. .................... 152/526; 152/548; 152/538; 152/450; 152/563; 156/134; 139/383 R; 139/434
[58] Field of Search ................... 152/357 R, 358, 359, 152/361 R, 361 FP, 361 DM, 362 CS, 450, 526, 538, 548, 563; 139/383 R, 434; 156/134, 157, 159, 258

[56] References Cited

U.S. PATENT DOCUMENTS

| 523,270 | 7/1894 | Dunlop et al. | 152/361 R |
| 3,227,191 | 10/1962 | Juillard | 139/383 R |
| 3,457,966 | 7/1969 | Cujai | 139/434 |
| 4,261,393 | 4/1981 | Saito et al. | 152/358 |

Primary Examiner—Lois E. Boland
Attorney, Agent, or Firm—Becker & Becker, Inc.

[57] ABSTRACT

A pneumatic vehicle tire having a carcass and belt made of shot-in cord fabric. In order to achieve a uniform thread density of the warp threads over the width of the layers required for forming the cord fabric, the present invention provides woof threads of finite length. The ends of these threads are guided back into the fabric by an extent which is sufficient to hold them in the fabric structure.

8 Claims, 6 Drawing Figures

PNEUMATIC VEHICLE TIRE

BACKGROUND OF THE INVENTION

1. Field of the Invention

The present invention relates to a pneumatic vehicle tire having, as reinforcement, a carcass and/or a belt made of picked or shot-in cord fabric.

2. Description of the Prior Art

With heretofore known tires of this type, the weft or woof threads, which essentially only serve to hold together the cord threads during manufacture of the tire, are continuously guided as practically endless threads of low strength from one edge of the cord fabric layer to the other edge thereof. The thus produced cord fabric, which comprises longitudinally extending warp threads in conformity with its application, then must be subdivided into rectangular or trapezoidal portions. The thus obtained portions then are joined together again to form layers or sheets utilizing small overlap zones; these layers eventually serve for manufacture of the tire.

Such manufacture of the tire cord fabric by continuously guiding the woof threads back and forth results in the unavoidable drawback of a greater thread density of the warp threads in the vicinity of the edges of the layer. This drawback can be attributed directly to the aforementioned guidance of the woof threads.

Obviously, a non-uniform density of the warp threads leads to a non-uniform construction of the reinforcement, whether one is talking about the carcass or the belt. These drawbacks become even greater in the region of the aforementioned overlap zones for the formation of rectangular or parallelogram-like fabric sections.

An object of the present invention is to construct the reinforcement of the aforementioned general type in such a way that a nearly constant thread density of the warp threads is obtained over the width of the previously mentioned layers, so that an overall improvement of the reinforcement of the tire body can be achieved.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The pneumatic vehicle tire of the present invention is characterized primarily in that the woof threads are in the form of finite threads, the ends of which are guided back into the fabric by an extent or distance which is sufficient to hold them in the fabric structure.

Preferably, the extent to which the woof threads are guided back is approximately 10 to 20 mm, and in particular especially at a thread density of the warp threads of 50 to 150 threads/10 cm, or at an average of 100 threads/10 cm.

The extent to which the woof threads are guided back may be approximately 3 to 10 times greater than the overlap of adjacent fabric portions.

Pursuant to the present invention, the woof threads are not guided continuously back and forth from one edge of the layer to the other; rather, the return travel of the woof threads so to speak, is interrupted. The aforementioned returned or led-back ends then only have the length described above, with it being possible for even shorter return lengths to provide additional warp threads in the edge region in order to fix or hold in place the led-back ends. For example, thin cotton threads can be used as travelers in order to thus exert an additional effect upon the returned ends of the woof threads The inventively produced fabric has a practically uniform warp thread density from one edge to the other. Displacement of the warp threads by the guided-back ends of the woof threads cannot occur because due to the short length of the returned ends, a reduction of stress occurs in the fabric structure, and no undesired displacement of the warp threads occurs.

In the tires of the present invention, the cord fabric, which forms the carcass, may be provided with radially extending warp threads.

DESCRIPTION OF PREFERRED EMBODIMENTS

Figure 1:
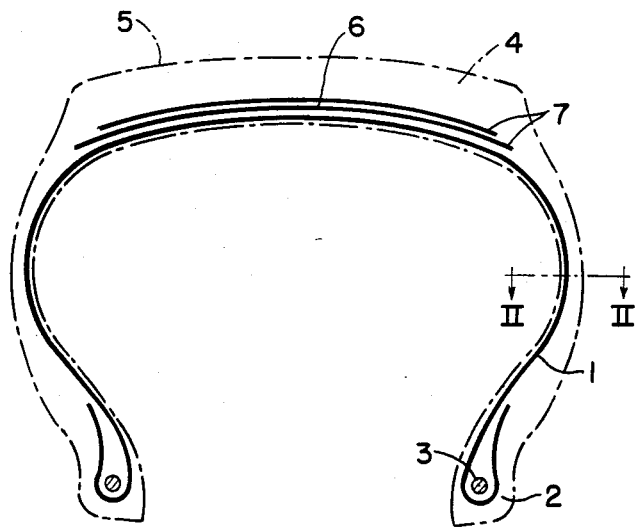
FIG. 1 is a partial radial sectional view taken through one inventive embodiment of a pneumatic vehicle tire.

Referring now to the drawings in detail, the tire body, which essentially comprises rubber or rubber-like synthetic material, has a carcass 1 which is guided in an uninterrupted manner from one bead 2 to the other bead 2, where the carcass is anchored by being looped around the respective bead core 3. A belt 6, which is composed of two superimposed plies 7, is disposed between the tread strip 4 and the carcass 1. The belt 6 is pull-resistant in the circumferential direction, and essentially extends over the width of the tread surface 5. All reinforcements of the pneumatic tire of FIG. 1 are fixedly disposed in the customary manner in the tire body, which comprises rubber or the like, by vulcanization.

Not only the single-ply carcass 1, but also each of the two plies 7 of the belt 6, comprise cord fabric having suitable filiform warp threads 8 which are disposed in parallel alignment. In the carcass 1, the warp threads 8 are disposed in planes which are radial relative to the tire, while in the belt 6 the warp threads 8 of the respective plies 7 cross one another to form a symmetrical rhomboid arrangement. The warp threads 8 of one of the plies 7 extend in a first inclined direction, while the warp threads 8 of the other ply 7 extend in the opposite inclined direction.

Due to its annular shape, and with a view toward the production of the tire cord fabric, the reinforcement of the tire which forms the plies 7 and the carcass 1 is comprised of sections which, for fabrication reasons, overlap by the amount "b". The extent of overlap is essentially 2 to 3 warp threads, in other words, approximately 2 to 4 mm.

In order to be able to properly process, e.g. rubberize, the cord layers for the carcass 1 and the belt 6, weft or woof threads 9 of cotton are provided. After the tire is finished, the woof threads 9 have practically fulfilled their mission and then can be destroyed without having to accept drawbacks relative to the strength of the tire.

The important thing is that the woof threads 9 not be continuously guided back and forth across the individual layers, but rather that the threads be led back to the extend "c", which should be approximately 10 to 20 mm. As the warp threads 8 are picked or shot-in, the woof threads 9 are not continuously guided back and forth; rather, finite sections thereof are used, or these threads are cut to length. The ends of the woof threads 9 which are led back are indicated in the drawings by the reference numeral 10.

The length of the ends or portions 10 should be kept as small as possible, so that fixation thereof is just assured. In the embodiment illustrated in FIGS. 1 and 3, approximately 100 warp threads 8 are disposed on a fabric width of 10 cm, while only 10 woof threads 9 are utilized for a length of the fabric layer of 10 cm.

Accordingly, the dimension "c" is approximately 3 to 10 times greater than the overlap width "b".

Figure 2:
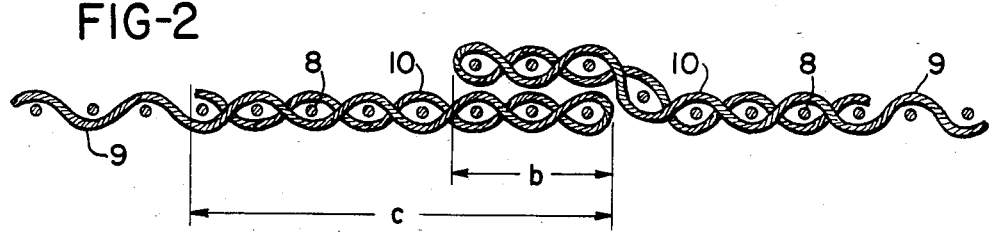
FIG. 2 is a partial sectional view taken through the carcass of the tire of FIG. 1 along the line II—II thereof.
Figure 3:
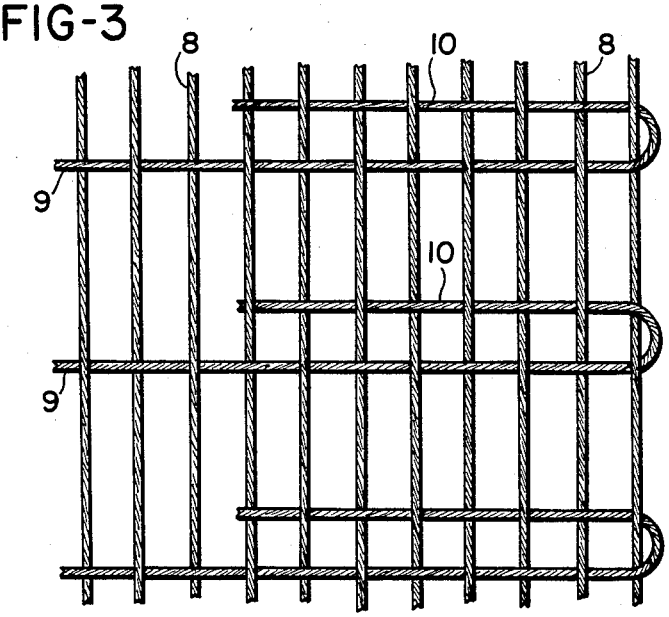
FIG. 3 is a partial plan view of the carcass fabric of FIG. 2.
Figure 4:
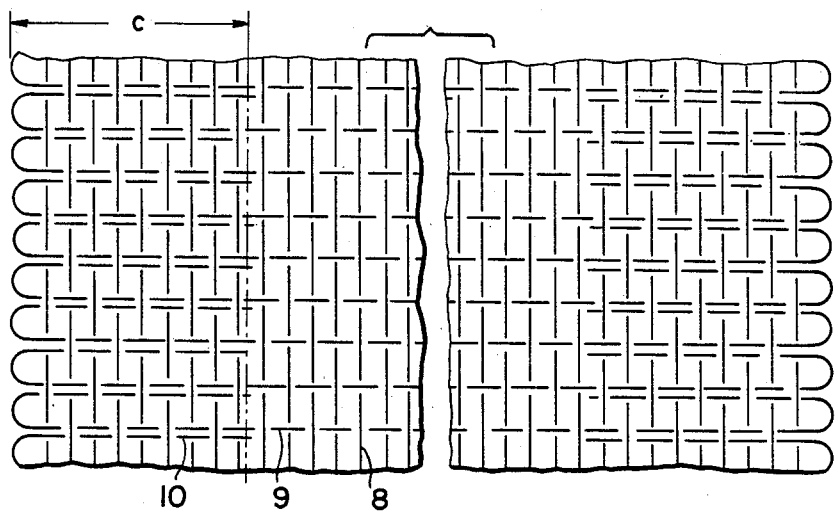
FIGS. 4, 5, and 6 are partial plan views of other inventive embodiments of carcass fabric sections.
Figure 5:
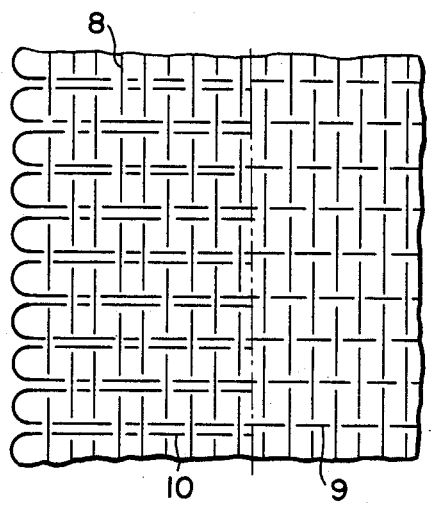

In order to vary the effect of the ends 10, embodiments which differ from that of FIGS. 2 and 3 can be utilized, especially embodiments which differ with regard to the cross-weaving of the led-back ends 10. In this connection, there is to be understood that the effect of the ends 10 should be kept as slight as possible, although always there must be assured that the ends 10 maintain the aforementioned position at least for the finishing process of the tire.

Figure 6:
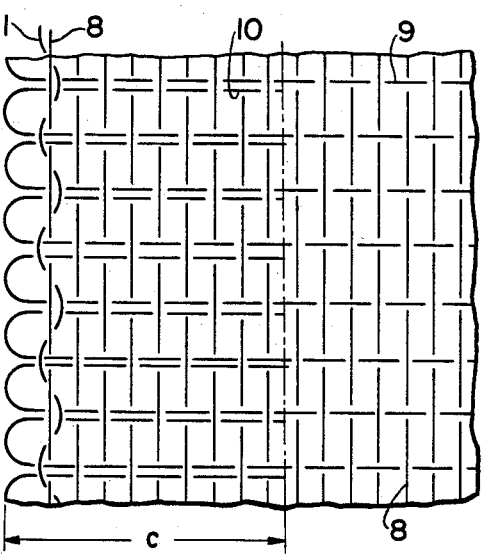

In the embodiment illustrated in FIG. 6, the cord thread 8 located at the edge is utilized as a stationary or standing thread; a thin cotton thread 11 serves as a traveler for particular fixation of, or to bind, the ends 10.

The inventive construction of the reinforcements is particularly suitable for radial carcasses, because a particularly uniform arrangement of the carcass threads is important in such a case.

The present invention, of course, in no way restricted to the specific disclosure of the specification and drawings, but also encompasses any modifications within the scope of the appended claims.

What I claim is:

1. In a pneumatic vehicle tire having a reinforcement at least one of a carcass and a belt wherein at least one of said carcass and said belt is comprised of sections which overlap one another by a predetermined amount and are made of a shot-in or picked cord fabric having wrap threads and woof threads, the improvement wherein ends of the woof threads are guided back into said overlapping sections of cord fabric by a distance which is sufficient to hold said ends in the structure of said cord fabric, with said distance further being in a range of approximately three times to ten times greater than the amount by which two of said cord fabric sections overlap.

2. A tire according to claim 1 in which said distance by which said ends of said woof threads are guided back into said fabric is in a range of approximately 10 to 20 mm.

3. A tire according to claim 2, in which said fabric has a warp thread density in a range of from 50 to 150 threads per 10 cm fabric width as measured transverse to the longitudinal direction of said warp threads.

4. A tire according to claim 3, in which said fabric includes in a range of approximately 5 to 15 woof threads per 10 cm fabric length as measured in the longitudinal direction of said warp threads.

5. A tire according to claim 1, in which said fabric includes further threads, which essentially extend in the warp direction, for binding said guided-back ends of said woof threads.

6. A tire according to claim 5, in which said further threads are in the form of travelers of cotton yarn.

7. A tire according to claim 1, in which said carcass is made of said cord fabric, with said warp threads thereof extending essentially in the radial direction of said tire.

8. A tire according to claim 1, in which said belt is made of said cord fabric and wherein said belt is composed of two superimposed plies of said cord fabric with the warp threads of one of the plies extending in a first inclined direction while the warp threads of the other ply extend in an opposite inclined direction wherein the warp threads in said respective plies cross one another to form a symmetrical rhomboid arrangement.

* * * * *